Aug. 22, 1933.  F. D. DOWLING  1,923,970
AUTOMOBILE HEADLIGHT PROTECTOR
Filed Jan. 11, 1932
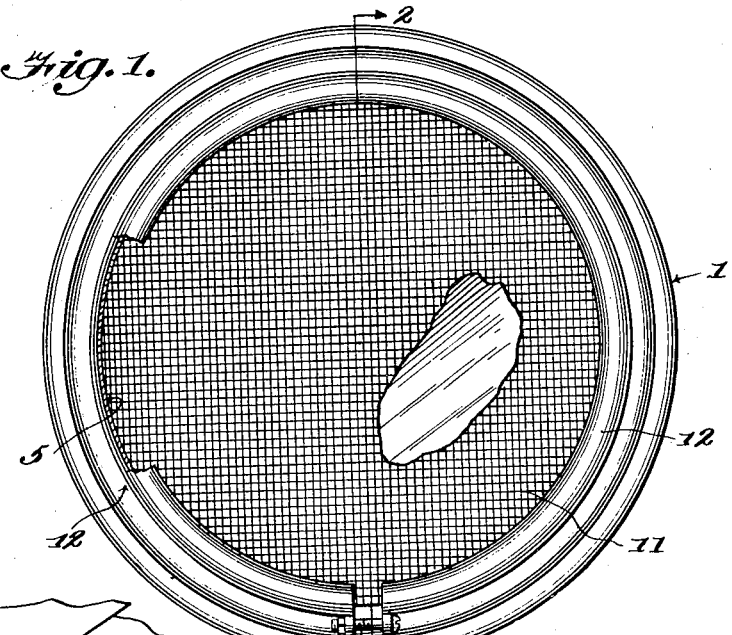
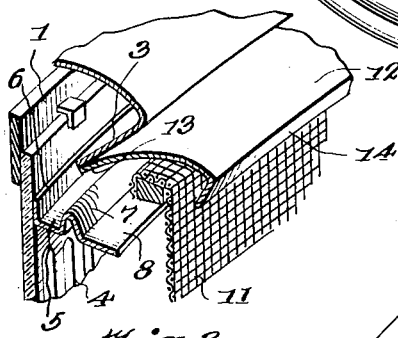
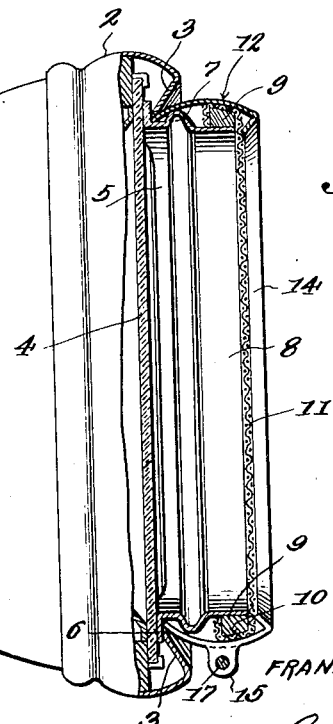
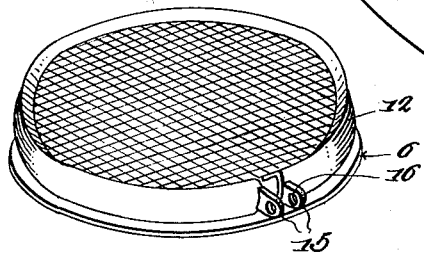
Inventor
FRANK D. DOWLING Patented Aug. 22, 1933

1,923,970

UNITED STATES PATENT OFFICE 1,923,970

AUTOMOBILE HEADLIGHT PROTECTOR

Frank Dewey Dowling, Plaquemine, La.

Application January 11, 1932. Serial No. 586,007

3 Claims. (Cl. 240—102)

This invention relates to protecting and ornamental screens for automobile headlamps and the like, and has for its object the production of a simple and efficient protecting means for the lens of an automobile lamp which will not only efficiently protect the lamp but will also beautify the headlamp.

One of the principal objects of this invention is the production of a simple and efficient means for supporting an ornamental screen in spaced relation with respect to the lens of an automobile lamp, so as to protect the lamp, bulb and reflector from damage caused by flying gravel set in motion by passing automobiles, fowl, sticks, insects, birds, and other objects which would be likely to disfigure or break the lens of the automobile lamp.

A still further object of this invention is the production of a simple and efficient means for firmly clamping the ornamental screen in spaced relation with respect to the lens and thereby efficiently supporting and holding the screen against rattling while the vehicle to which the lamp is secured is in motion.

With these and other objects in view, this invention consists in certain novel combinations, constructions and arrangements of parts as will be hereinafter fully described and claimed.

In the drawing:—

Figure 1 is a front elevation of my improved and ornamental protecting screen, certain parts being broken away and shown in section;

Figure 2 is a vertical sectional view taken on line 2—2 of Figure 1;

Figure 3 is a fragmentary perspective view of a portion of the lamp, protecting screen, and supporting means; and Figure 4 is a perspective view of the ornamental protecting screen detached from a headlight.

By referring to the drawing, it will be seen that 1 designates a conventional type of automobile headlight which is provided with a suitable inturned lens retaining rim 2, varied in accordance with the particular type of headlight or lamp used. The inturned rim 2 is provided with an inturned flange 3, which is adapted to normally abut against the front face of the lens 4.

In carrying out the present invention, I employ a thin aluminum circular or annular end 5 which is provided with an outwardly extending annular flange 6, which annular flange 6 is adapted to fit behind the inturned flange 3 of the lens retaining rim 2, thereby firmly holding the annular ring 5 in position. This annular ring 5 is provided with an annular outwardly pressed bead 7 spaced from the flange 6 and intermediate the side edges of the ring 5, as shown clearly in Figures 2 and 3 of the drawing. The ring 5 is also provided with a forwardly projecting collar 8 upon which is mounted an annular screen supporting ring 9, preferably substantially square in cross-section but being provided with a beveled outer face 10, and a suitable ornamental screen 11 is fitted over this screen supporting ring 9 and is welded or otherwise fixedly secured to the ring including the inturned face 10 so as to support the screen 11 in a taut condition across the face of the lens 4, and in spaced relation thereto. This screen 11 will therefore be stretched over the outer edge of the collar 8 of the ring 5. It has been found convenient and advisable to make the ring 9 which is substantially square in cross-section of brass or other suitable material to which the wire netting 11 is welded or otherwise secured, the wire netting or mesh being preferably aluminum steel wire, rust and weather resisting.

A clamping shell 12 is fitted snugly over the ring 9, and also the ring 5 and this shell 12 is preferably concavo-convex in cross-section having its inturned inner edge 13 fitting behind the bead or rib 7 and under the inturned flange 3 of the rim 2. The shell 12 is preferably annular in shape and is provided with an inclined inwardly bent screen retaining flange 14 which is adapted to abut snugly the wire mesh screen 11, as shown clearly in Figure 2. This shell 12 is preferably of a split-band type having the laterally extending ears 15 preferably projecting from the bottom of the shell, and being apertured as at 16, for the purpose of receiving the clamping bolt 17 which is adapted to adjustably and securely hold the shell 12 in clamped engagement over the ring 5, and in engagement also with the wire mesh screen 11. By means of this clamping screw 17, it will be seen that the shell 12 will be firmly held in position and in view of the fact that the inturned edge 13 of the substantially concavo-convex shell 12 fits behind the bead 7, the screen will be held against accidental removal from the ring 5. This shell 12 is preferably made of chromium plate, highly polished, or decorated in any suitable or desired manner.

From the foregoing description it will be seen that a very simple and efficient means has been produced for supporting the screen 11 in spaced relation with respect to the lens 4, and at the same time the screen is so mounted as to efficiently attach the same to a standard type of automobile headlight without the necessity of materially changing the structure of the headlight or lens securing or supporting means.

Furthermore, it should be understood that a very simple and efficient means has been provided for protecting the lens against foreign objects, such as flying gravel, fowl, birds, insects, and any other possible means of chance which might menace the road, street or highway, and which might likely be thrown against the headlight lens. The screen will not in any way affect the brilliancy of the beam from the light, but will effectively protect the lens against injury. Furthermore, a very durable structure is provided which is adapted to last the full life of the automobile lamp without the necessity of replacement.

It should be understood that certain detail changes in the mechanical construction may be employed without departing from the spirit of the invention, so long as these changes fall within the scope of the appended claims.

Having described the invention, what I claim as new is:—

1. In combination with a headlight provided with a lens retaining band having an inturned retaining flange, a screen supporting ring having an outwardly extending annular flange at its inner end adapted to abut snugly against the front face of a lens, said inwardly turned flange of said retaining band overhanging the annular flange of said screen retaining ring, said screen retaining ring having an outwardly pressed bead formed intermediate the edges of said ring, a wire screen abutting the outer edge of said ring, a split retaining shell having an inturned edge fitting behind said bead and under said inturned flange of said lens retaining band, whereby said retaining shell will be detachably held upon said ring and may be easily removed therefrom when desired, and said retaining shell having an overhanging inwardly turned frame-engaging flange for holding said screen snugly against the outer edge of said ring.

2. In combination with a headlight having a lens retaining band, a lens carried by said headlight and retained in position by said lens retaining band, said lens retaining band having an inwardly inclined flange, a screen supporting ring abutting against said lens, means formed upon said ring for engaging said retaining band whereby said ring will be held in position, outwardly projecting means formed upon said ring, a screen carried by the front edge of said ring in spaced relation with respect to said lens, a split retaining shell enclosing said ring and screen and having an inturned inner edge fitting behind said outwardly projecting means formed on said ring and under the inturned flange of said retaining band for firmly holding said retaining shell in position, means for binding said retaining shell upon said ring, the forward edge of said retaining shell being provided with a flange inwardly inclined at approximately forty-five degrees for causing said retaining shell to project slightly beyond the front face of said screen, the inner edge of said last mentioned flange firmly engaging said screen and clamping said screen against the front edge of said ring.

3. In combination with a headlight having a lens retaining band, a lens supported thereby, said lens retaining band having an inwardly inclined lens retaining flange extending inwardly at an angle of substantially forty-five degrees, a screen supporting ring of material width clamped snugly against the front face of said lens by said inwardly turned flange of said lens retaining band, an outwardly pressed bead formed upon said ring and arranged in advance of said inwardly turned flange of said retaining band, a split retaining shell, means for clamping the ends of said retaining shell together for snugly holding said retaining shell snugly around said ring, said retaining shell being substantially concavo-convex in cross-section to provide an inturned inner edge adapted to fit behind said outwardly pressed bead and under said inturned flange of said lens retaining band, a screen stretched across the outer edge of said ring and snugly fitting thereover, a flange carried by the outer edge of said retaining shell and being bent inwardly at an angle of approximately forty-five degrees, the edge of which extends in alignment with the front edge of said ring for firmly clamping said screen between the edge of said last mentioned flange and the front edge of said ring.

FRANK DEWEY DOWLING.